March 1, 1960  J. L. WRIGHT ET AL  2,926,747
AIR FILTERING AND PURIFYING APPARATUS FOR AIR COOLERS
Filed Aug. 24, 1959
FIG_1
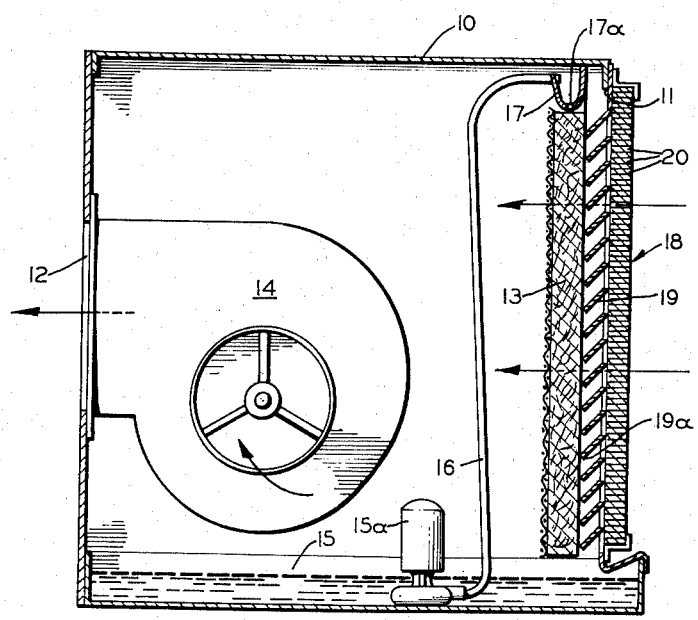
FIG_2
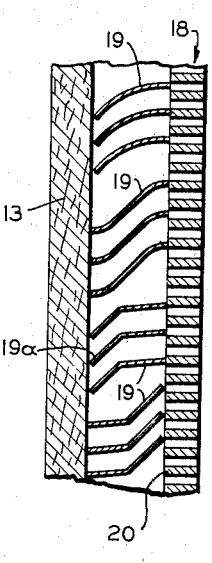
FIG_3
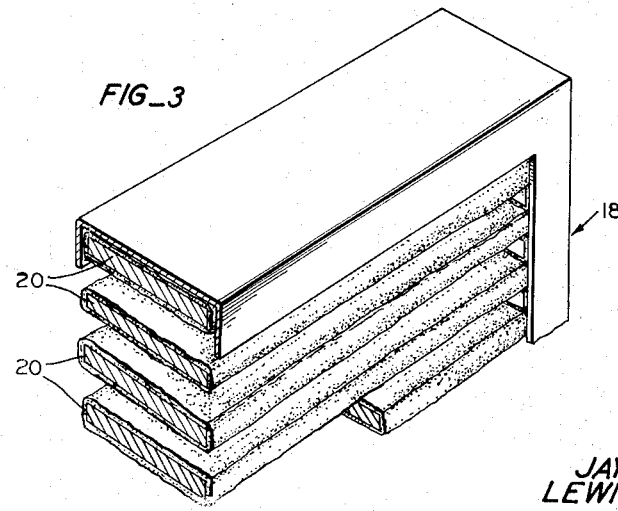
INVENTORS
JAY L. WRIGHT
LEWIS N. TENNEY United States Patent Office 2,926,747
Patented Mar. 1, 1960

2,926,747

AIR FILTERING AND PURIFYING APPARATUS FOR AIR COOLERS

Jay L. Wright and Lewis N. Tenney, Phoenix, Ariz., assignors to Wright Manufacturing Co., Phoenix, Ariz., a corporation of Arizona Application August 24, 1959, Serial No. 835,581

4 Claims. (Cl. 183—4.3)

This invention relates to air coolers, and more particularly pertains to an air filtering and purifying apparatus including a flow screen containing a highly adsorptive substance.

A full comprehension and appreciation of this invention requires some understanding of the property known as "adsorption." In general, adsorption involves an adhesion of molecules of one substance to the surface of a solid substance, which is called an adsorbent. It should be apparent that the surface molecules of any substance are unique in that, and unlike those in the interior, they are not surrounded on all sides by other molecules. Since the forces of intermolecular attraction are unsatisfied on the surface side of surface molecules, there is a tendency for them to hold molecules of other substances onto their surfaces. And it has been shown that the degree to which a substance exhibits the property of adsorption will depend upon the surface area provided in proportion to its mass. For this reason certain very porous substances like charcoal are good adsorbents. But adsorption is a selective process and, in general, the more readily a gas can be condensed the more strongly it will be adsorbed. This is to be expected because the forces of intermolecular attraction are strongest in gases of this character. And, accordingly, it is found that the charcoal of gas masks adsorbs the molecules of toxic vapors strongly but lets nearly all the oxygen and nitrogen molecules pass through.

At the present time, of course, the use of charcoal and other adsorbents in air filtering systems is well known. And, as in all air circulating and ventilating systems it is desirable to condition the air by removing noxious fumes and odors, thereby purifying the air and making it more agreeable to breethe. But certain difficulties have existed in adapting suitable adsorbents, such as charcoal, into a compact, water-evaporating air cooler system.

Systems of this type generally include an excelsior filter pad which is continually wetted by water. Then warm air is drawn through the wetted pad by a fan, causing water to be evaporated from the pad while simultaneously extracting heat from the air and producing a cooled and filtered air discharge. If a flow screen of adsorbent material is placed on the downstream side of the pad, it would be continually wetted by both water vapor and droplets which are often blown from the pad. This will have an extremely harmful effect upon the material as an adsorbent since it would coat the adsorbent surfaces, causing impairment to their operation. If the adsorbent screen is placed upstream of the pad, the above noted effect is less likely to occur, but only if the pad and screen are spaced a sufficient distance apart. But a satisfactory distance necessarily requires a bulky, enlarged structure which is impractical and which has proved very unsatisfactory.

Accordingly, it is one object of this invention to provide a compact air cooler construction which has incorporated therein an adsorbent flow screen.

A more specific object is to provide an air filtering and purifying apparatus for use in air coolers comprising an evaporating pad vertically disposed in the path of air flow, means for depositing a fluid coolant above said pad and allowing said coolant to be passed downwardly therethrough, means providing a plurality of vertically inclined louver surfaces having lower edges in close-lying relation to said pad, said surfaces extending upwardly and outwardly therefrom, and a flow screen vertically disposed in the path of air flow on the outer side of said louver means, said flow screen being formed of vanes of fibrous material coated and impregnated with charcoal.

Other objects of this invention will become apparent in view of the drawings and the following detailed description.

In the drawings forming a part of this application, and in which like parts are designated by like reference numerals throughout the same, Fig. 1 is an exposed side elevation of an air cooler which has embodied therein the novel concept of this invention.

Fig. 2 is a side elevation of various alternative forms of louvered surfaces which may be used between the evaporating pad and the flow screen.

Fig. 3 is a perspective view of a vaned structure which is impregnated with an adsorbent material.

Referring to the drawings, there is illustrated one embodiment of this invention in water-evaporating air cooler systems. The air cooler shown includes a frame housing 10 having an air intake opening 11 and a discharge opening 12. Adjacent intake opening 11 is a vertically disposed excelsior filter and evaporating pad 13 through which all air entering the housing must pass; and a conventional motor-driven fan assembly 14 is disposed within the housing adjacent discharge opening 12. The excelsior evaporating pad 13 is continually wetted and maintained saturated with water by a recirculating system including a reservoir pan 15, a pump 15a, conduit 16 and a horizontal feeder trough 17 which surmounts pad 13, said feeder trough having a plurality of small openings 17a through which water flows onto and down through pad 13.

The above described construction is conventional and by itself forms no part of this invention. Its operation will be better understood in view of Fig. 1 where flow lines indicate that currents of warm air will be drawn into the housing through the excelsior pad 13, which causes the air to be cooled and filtered; then the cooled air is discharged out opening 12 by fan assembly 14.

But in addition to the above conventional apparatus there is also provided a purifying flow screen 18 containing a highly adsorbent material and a set of louver vanes 19. The louver vanes are disposed between the flow screen and the evaporating pad, and because vanes 19 are vertically inclined, having lower edges 19a adjacent pad 13, no water droplets or spray can pass laterally onto flow screen 18. Accordingly, there is no danger that water will inadvertently spill or be splashed onto the flow screen, which would impair its effectiveness. It will also be noted that while the louver vanes accomplish the desired objective and allow the adsorbent to be disposed in close-lying relation to the wetted excelsior pad, they do not impede the flow of air into the cooler housing.

Other forms of louver vanes may be utilized so long as they provide a vertically inclined surface portion to prevent drainage of the water droplets onto the adsorbent flow screen. Thus, the use of arcuate shaped vanes and dihedral surfaces, such as those shown in Fig. 2, are also contemplated.

A particular structure for a purifying flow screen is shown in Fig. 3, and this structure has been found to be extremely satisfactory. The screen consists of a plurality of closely spaced, parallel vanes 20 which are formed of a fibrous material. These vanes are impregnated and coated with charcoal, which is a fine adsorbent and may be conveniently handled.

In view of the drawings and the above described apparatus it will be apparent to those skilled in the water-evaporating air cooler art that there is provided a novel and useful apparatus for purifying the warm air drawn into the cooler. While only a preferred embodiment of this invention is shown and described, it is to be understood that various changes may be made in the construction of the air cooler and the adsorbent flow screen without departing from the spirit of the invention or the scope of the attached claims, and each of these changes is contemplated.

Having thus described our invention, what we claim and desire to secure by Letters Patent is:

1. An air filtering and purifying apparatus for use in air coolers comprising an evaporating pad vertically disposed in the path of air flow, means for depositing a fluid coolant above said pad and allowing said coolant to be passed downwardly therethrough, means providing a plurality of vertically inclined louver surfaces having lower edges in close-lying relation to said pad, said surfaces extending upwardly and outwardly therefrom, and a flow screen vertically disposed in the path of air flow on the outer side of said louver means and closely adjacent said louver means, said flow screen containing a highly adsorbent and purifying material.

2. An air filtering and purifying apparatus for use in air coolers comprising an evaporating pad vertically disposed in the path of air flow, means for depositing a fluid coolant above said pad and allowing said coolant to be passed downwardly therethrough, means providing a plurality of vertically inclined louver surfaces having lower edges in close-lying relation to said pad, said surfaces extending upwardly and outwardly therefrom, and a flow screen vertically disposed in the path of air flow on the outer side of said louver means and closely adjacent said louver means, said flow screen containing activated charcoal.

3. An air filtering and purifying apparatus for use in air coolers comprising an evaporating pad vertically disposed in the path of air flow, means for depositing a fluid coolant above said pad and allowing said coolant to be passed downwardly therethrough, means providing a plurality of vertically inclined louver surfaces having lower edges in close-lying relation to said pad, said surfaces extending upwardly and outwardly therefrom, and a flow screen vertically disposed in the path of air flow on the outer side of said louver means and closely adjacent said louver means, said flow screen being formed of vanes of fibrous material coated with a highly adsorbent and purifying material.

4. An air filtering and purifying apparatus for use in air coolers comprising an evaporating pad vertically disposed in the path of air flow, means for depositing a fluid coolant above said pad and allowing said coolant to be passed downwardly therethrough, means providing a plurality of vertically inclined louver surfaces having lower edges in close-lying relation to said pad, said surfaces extending upwardly and outwardly therefrom, a flow screen vertically disposed in the path of air flow on the outer side of said louver means and immediately adjacent said louver means, said flow screen being formed of vanes of fibrous material coated and impregnated with charcoal.

References Cited in the file of this patent
UNITED STATES PATENTS

| | | |
|---|---|---|
| 2,146,071 | Horvath | Feb. 7, 1939 |
| 2,829,732 | Goettl | Apr. 8, 1958 |